United States Patent [19]

Sloan

[11] Patent Number: 5,191,228
[45] Date of Patent: Mar. 2, 1993

[54] VEHICLE BATTERY DISCONNECT ANTITHEFT DEVICE

[76] Inventor: Jeffrey M. Sloan, 312 George St., Birmingham, Mich. 48009

[21] Appl. No.: 776,879

[22] Filed: Oct. 16, 1991

Related U.S. Application Data

[63] Continuation of Ser. No. 542,118, Jun. 22, 1990, abandoned.

[51] Int. Cl.$^5$ ............................................. B60R 25/04
[52] U.S. Cl. ................... 307/10.3; 180/287; 307/10.6
[58] Field of Search .................. 307/10.2, 10.3, 10.6; 340/426; 200/61.5, 50 C; 180/287; 70/DIG. 30, 239, 241, 250, 251, 255, 257

[56] References Cited

U.S. PATENT DOCUMENTS

| | | | |
|---|---|---|---|
| 3,692,965 | 9/1972 | Gardner | 200/43.07 |
| 3,833,097 | 9/1974 | Holst | 200/61.46 |
| 4,209,709 | 6/1980 | Betton | 307/10.3 |
| 4,887,064 | 12/1989 | Drori et al. | 340/426 |
| 4,958,084 | 9/1990 | Carlo et al. | 307/10.2 |

FOREIGN PATENT DOCUMENTS 8501708  4/1985  World Int. Prop. O. .......... 180/287

Primary Examiner—A. D. Pellinen
Assistant Examiner—Richard Elms
Attorney, Agent, or Firm—Gifford, Groh, Sprinkle, Patmore & Anderson

[57] ABSTRACT

An antitheft device is provided for use in conjunction with a vehicle having an engine, an electrical system with an electrical starter, and a battery. The antitheft device includes a conventional alarm system which detects an unauthorized attempt to enter or start the vehicle motor and which generates an output signal representative thereof. A normally closed switch is connected in series between the battery and the vehicle electrical system. A switch actuator circuit is electrically connected to the alarm system and, upon receipt of an alarm signal from the alarm system, actuates the switch to the open position thereby disconnecting the vehicle battery from the engine starter and preventing unauthorized vehicle ignition. The switch actuator circuit also includes circuitry which detects an engine running condition which prevents actuation of the switch at any time that the engine is operating. In an alternate embodiment of the invention, the device automatically disconnects the battery from the ignition system whenever the ignition is turned off and, similarly, reconnects the battery whenever an authorized use of the vehicle is initiated.

6 Claims, 3 Drawing Sheets

VEHICLE BATTERY DISCONNECT ANTITHEFT DEVICE

This is a continuation of copending application Ser. No. 07/542,118 filed on Jun. 22, 1990 now abandoned.

BACKGROUND OF THE INVENTION

I. Field of the Invention

The present invention relates generally to antitheft systems and, more particularly, to such a system for use with a motor vehicle having an electrical ignition system.

II. Description of the Prior Art

There are many different types of antitheft systems designed for motor vehicles having electrical ignition. systems which are designed to prevent unauthorized use of the vehicle. Such systems are frequently found in automobiles, trucks, vans and the like.

Typically, with these previously known antitheft systems, the antitheft system detects an unauthorized use or entry to the vehicle and, when such a condition is detected, activates the alarm system. The alarm system in turn activates an audible alarm signal, such as a siren or the horn on the vehicle in an attempt to draw attention to the vehicle. In theory, the thief will become frightened by the alarm system and abandon his or her attempt to steal the vehicle.

In practice, however, many of the previously known alarm systems are prone to false alarms so that activation of the alarm system has become a rather commonplace event. As such, activation of the alarm system no longer draws attention to the vehicle in the intended fashion simply because bypassers assume that the alarm is a false alarm. This disadvantageously gives the thief sufficient time to disconnect the audible alarm and thereafter start or hotwire the car at the thief's leisure.

SUMMARY OF THE PRESENT INVENTION

The present invention provides an antitheft system particularly designed for motor vehicles which overcomes the above mentioned disadvantages of the previously known devices.

In brief, the present invention provides an antitheft system for a motor vehicle having an electrical ignition system. Any conventional alarm system is used to detect an unauthorized attempt to start or enter the motor vehicle. Such systems typically include limit switches, proximity switches and the like and, whenever an unauthorized use of the vehicle is attempted, the alarm system generates an alarm signal. In response to the alarm signal, the alarm signal may sound an audible alarm, flash the vehicle headlights and/or the like.

The present invention further comprises a normally closed switch means which is connected in series between the vehicle battery and the vehicle electrical system, including the vehicle ignition system. A switch actuating circuit means is also provided and receives the alarm system as an input signal. Upon receipt of the alarm signal from the alarm system, the switch actuator circuit actuates the switch means to open the switch from its normally closed position to an open position. In doing so, the vehicle battery is electrically disconnected from the vehicle electrical system, including the ignition system, which effectively prevents ignition and/or operation of the motor vehicle. Consequently, even if the thief is able to disconnect the audible and/or visual alarms activated by the alarm system, the thief is still unable to start the vehicle.

The switch actuator circuit also preferably includes means to disable the switch actuator circuit in the event that the engine is running in order to prevent unintended disconnection of the battery during vehicle operation. In the preferred form of the invention, the switch actuator circuit includes means for detecting electrical noise on the vehicle electrical system indicative of engine ignition. In the event that such noise is detected, the switch actuator circuit is disabled. Alternatively, however, a hard wire from the ignition system, indicative of an authorized use of the vehicle, can be used to disable the battery disconnect device to prevent unintended disconnection of the battery.

Similarly, in the preferred embodiment of the invention, the switch actuator circuit detects a very low voltage condition, e.g. nine volts, which would be indicative of a high current engine starting condition. In this event, the switch actuator circuit is disabled to prevent undesirable arcing or welding of the switch contacts.

In an alternative embodiment of the invention, the battery disconnect device automatically electrically disconnects the battery from the ignition system whenever the vehicle is turned off. In this embodiment, the device then detects an authorized use of the vehicle, for example by detecting actuation of the ignition system, and then automatically reconnects the battery.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
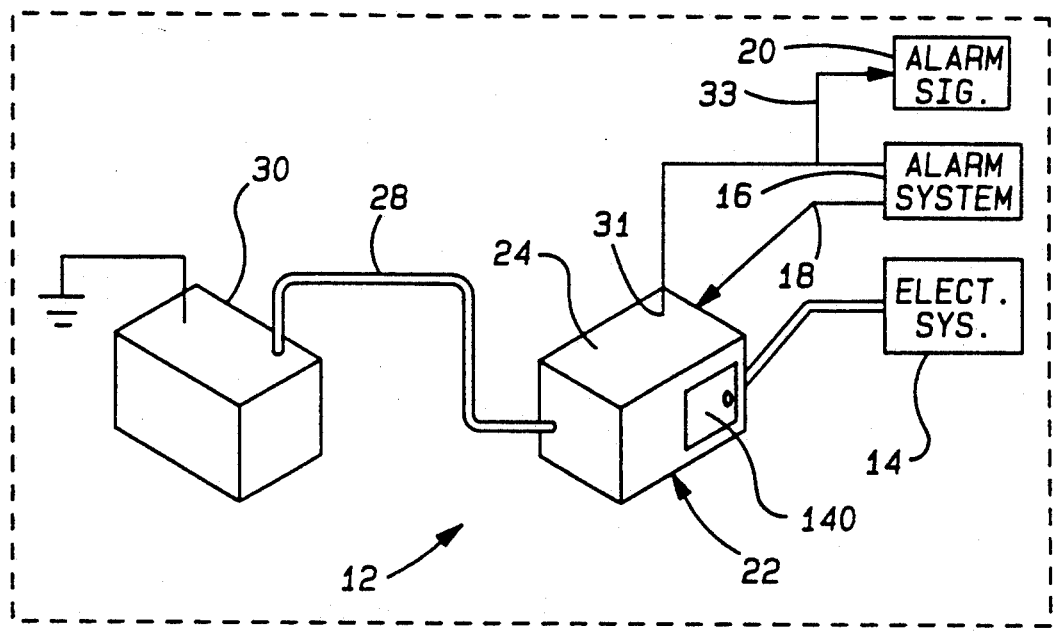
FIG. 1 is a perspective diagrammatic view illustrating a preferred embodiment of the present invention.

With reference first to FIG. 1, a preferred embodiment of the antitheft device 10 of the present invention is thereshown for use with a motor vehicle 12 (illustrated diagrammatically) having an electrical system 14 including an electrical ignition system. Such systems are commonly found on motor vehicles, such as automobiles, trucks, vans and the like.

The antitheft device 10 includes a conventional alarm system 16 which detects an unauthorized entry or use of the vehicle 12 and generates a signal on its output line 18 representative thereof. The alarm system 16 can be of any conventional construction and may use limit switches, vibration switches, and the like to detect the unauthorized entry or use of the vehicle 12. Additionally, once the alarm system 16 detects an unauthorized entry to the vehicle, it typically activates an audio/visual alarm 20.

Figure 2:
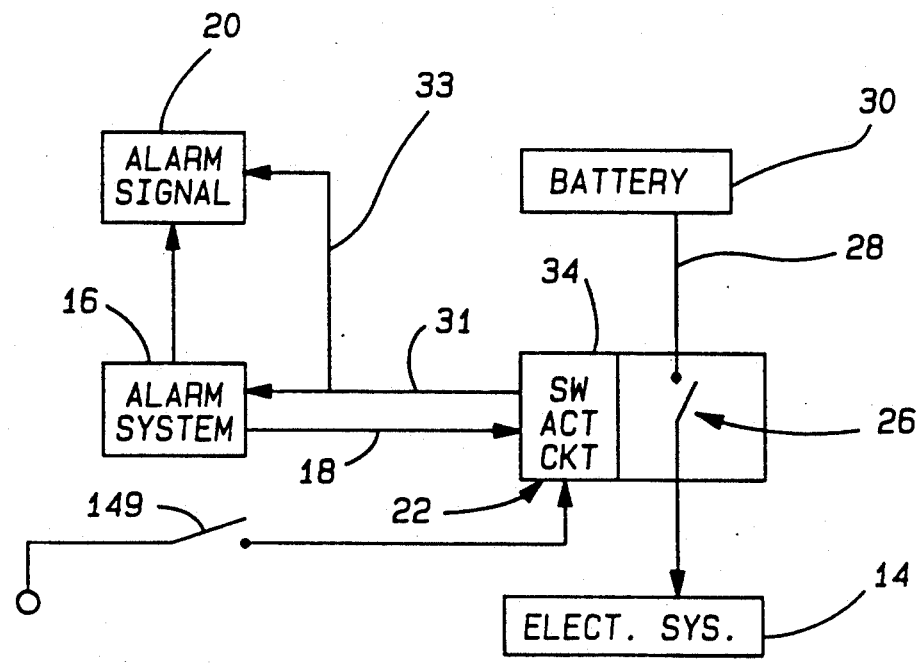
FIG. 2 is a block diagrammatic view illustrating a preferred embodiment of the present invention.

The antitheft system of the present invention further comprises a battery disconnect device 22 contained within a housing 24. As best shown in FIGS. 1 and 2, the battery disconnect device 22 includes a switch 26 which is electrically connected in series between a power line 28 from the vehicle battery 30 and the electrical system 14 of the vehicle. The switch 26, furthermore, is normally closed thus enabling normal operation of the vehicle electrical system 14. The actual construction of the one preferred embodiment of the switch 26 will be subsequently described.

An auxiliary power port 31 on the housing 22 preferably provides electrical power on line 33 to the alarm system 16 as well as the audio/visual alarm 20. Thus, even in the event of battery disconnection as will be subsequently described, both the alarm system 16 and the alarm 20 continue to operate. This auxiliary power port 31 can also be used to power selected vehicle accessories, such as a radio and emergency flashers, but would not be used to power the vehicle ignition system.

Figure 3:
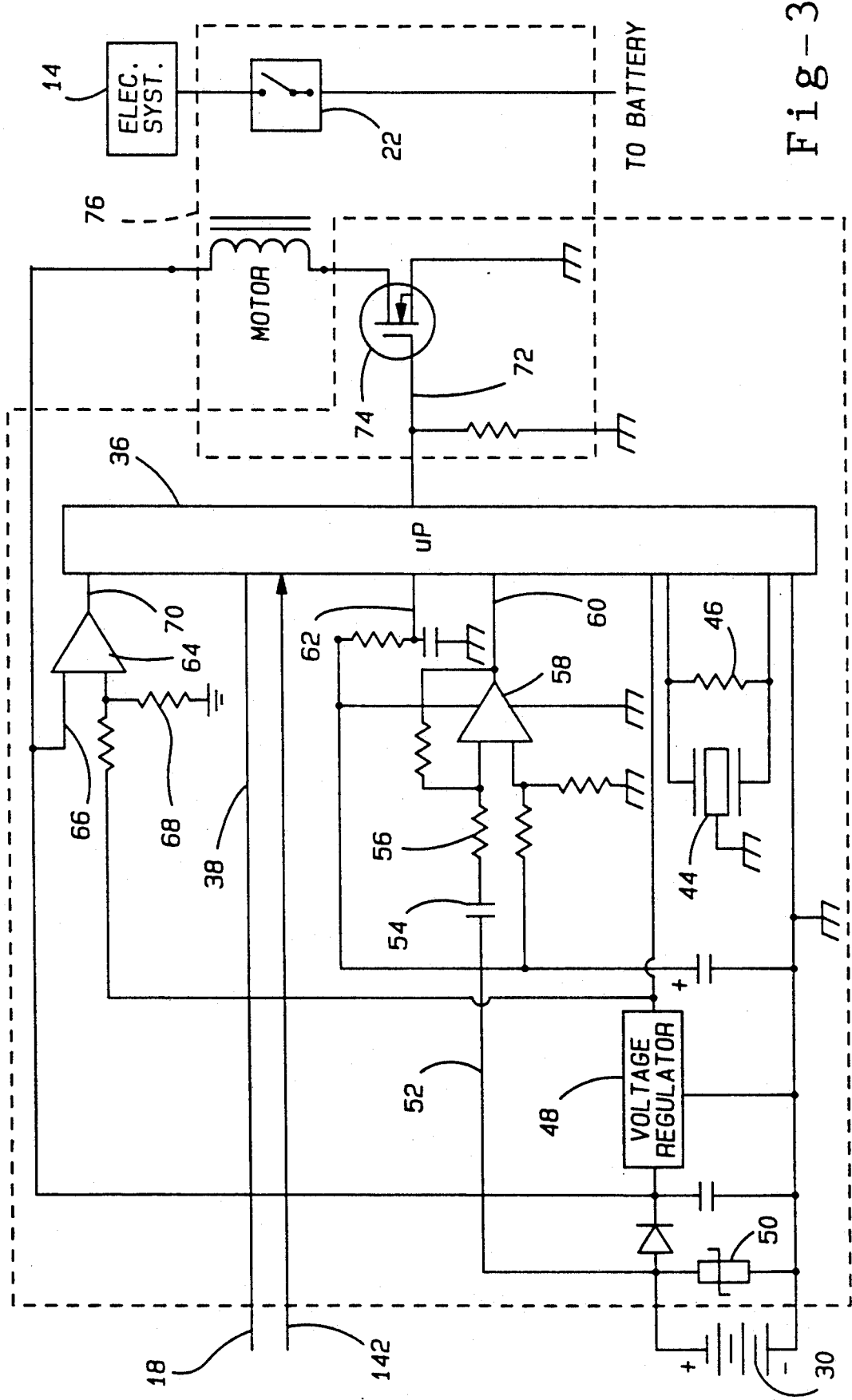
FIG. 3 is a schematic view illustrating a portion of the preferred embodiment of the invention.

With reference now to FIGS. 2 and 3, the disconnect device 22 further includes a switch actuator circuit 34 which controls the actuation of the switch 26. As best shown in FIG. 3, in the preferred embodiment, the switch actuator circuit 34 includes a microprocessor 36 having an input line 38 electrically connected to the output line 18 from the alarm system 16. Thus, in the event that the alarm system 16 detects an unauthorized entry and/or use of the vehicle, the alarm system 16 generates an output signal on its line 18 to the input 38 of the microprocessor 36. The actual processing of such a signal will be subsequently described.

Referring now to FIG. 3, the circuit 34 includes a crystal 44 and resistor 46 combination which provides the appropriate timing circuitry to the microprocessor 36. In addition, a voltage regulator 48 provides a regulated voltage supply for the microprocessor 36 while a varactor 50 protects the microprocessor 36 and its associated components against damage from voltage spikes.

The battery 30 is also connected through line 52, capacitor 54 and resistor 56 to one input of an operational amplifier 58 which both detects and amplifies any electrical noise on the vehicle electrical system. This amplified noise is then provided as an input signal on line 60 to the microprocessor 36 for a reason to be subsequently described.

The microprocessor 36 also includes a power reset input 62 which is electrically connected to the power line from the battery 30. The power reset 62 provides an orderly system reset for the microprocessor 36 upon connection of electrical power to the microprocessor 36 in the well known fashion.

Lastly, a voltage comparator 64 receives a signal on one input line 66 representative of the actual battery voltage from the battery 30, while a reference voltage is connected on the second input 68 of the comparator 64. The comparator 64 thus generates a signal on its output 70 to the microprocessor 36 whenever the actual battery voltage 30 falls below a preset amount, for example nine volts. The reason for this will be subsequently described.

Still referring to FIG. 3, the microprocessor 36 includes an output line 72 connected to the gate of a FET transistor 74. The anode and cathode of the FET transistor 74 are connected in series with a DC servomotor 76 which, upon actuation, moves the switch 22 from its closed to its open position.

Figure 4:
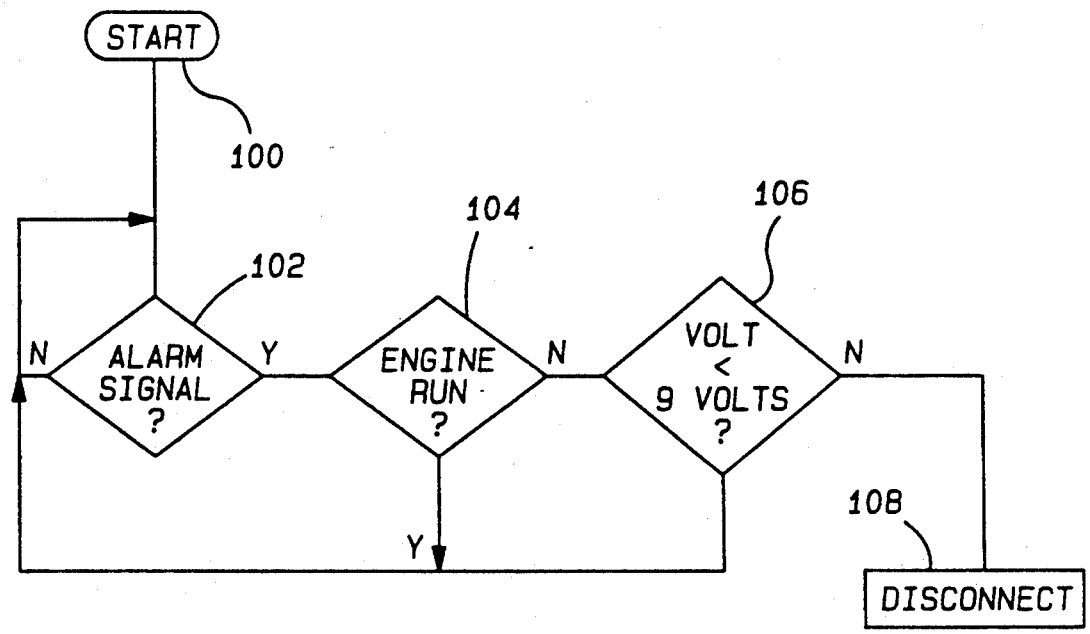
FIG. 4 is a flow chart illustrating the preferred embodiment of the invention.

With reference now to FIG. 4, a flow chart illustrating the operation of the microprocessor 36 is thereshown. After initiation of the program at step 100, step 100 branches to step 102 where the microprocessor determines whether or not an alarm signal was received on line 18 from the alarm system 16. If not, step 102 continually loops and waits for an intrusion or alarm signal on line 18 from the alarm system.

Assuming that an alarm signal is received on line 18 from the alarm system 16, step 102 instead branches to step 104 in which the microprocessor determines whether or not the engine is running. In order to accomplish this, the microprocessor compares the input on its line 60 from the operational amplifier 58 with the pattern indicative of an engine running condition. Such a pattern is preferably stored in memory accessible to the microprocessor 36. In the event that the engine is running, step 104 branches back to step 102 where the above process is repeated. In this fashion, step 104 prevents the unintended disconnection of the battery 30 from the engine electrical system 14 by the device of the present invention whenever the engine is running.

Alternatively, a hard wire from the ignition system can be used to disable the battery disconnect device to prevent unintended disconnection of the battery during vehicle operation. The hard wire from the ignition system contains a signal indicative of an authorized actuation of the ignition system, e.g. by the insertion and rotation of the ignition key in the ignition key slot.

Assuming that the engine is not running, step 104 instead branches to step 106 in which the microprocessor reads the value on its input line 70 from the voltage comparator to determine whether or not a low voltage condition, for example less than nine volts, is present on the battery power line 18. Such a low voltage condition would be indicative of an engine starting condition. Under such a high current condition, opening the switch 22 to disconnect the battery 30 from the engine electrical system 14 may undesirably cause electrical arcing and welding of the switch contacts. Thus, during such a low voltage condition, step 106 instead branches to step 102 where the above process is repeated.

Conversely, assuming that a low voltage condition is not detected at step 106, step 106 instead branches to step 108 at which the microprocessor 36 generates an output signal on its line 72 to the FET transistor 74. In doing so, the motor 76 is actuated thus opening the switch 22. Once the switch 22 is opened, the battery 30 is electrically disconnected with the vehicle electrical system 14 thereby preventing starting or operation of the engine.

Figure 5:
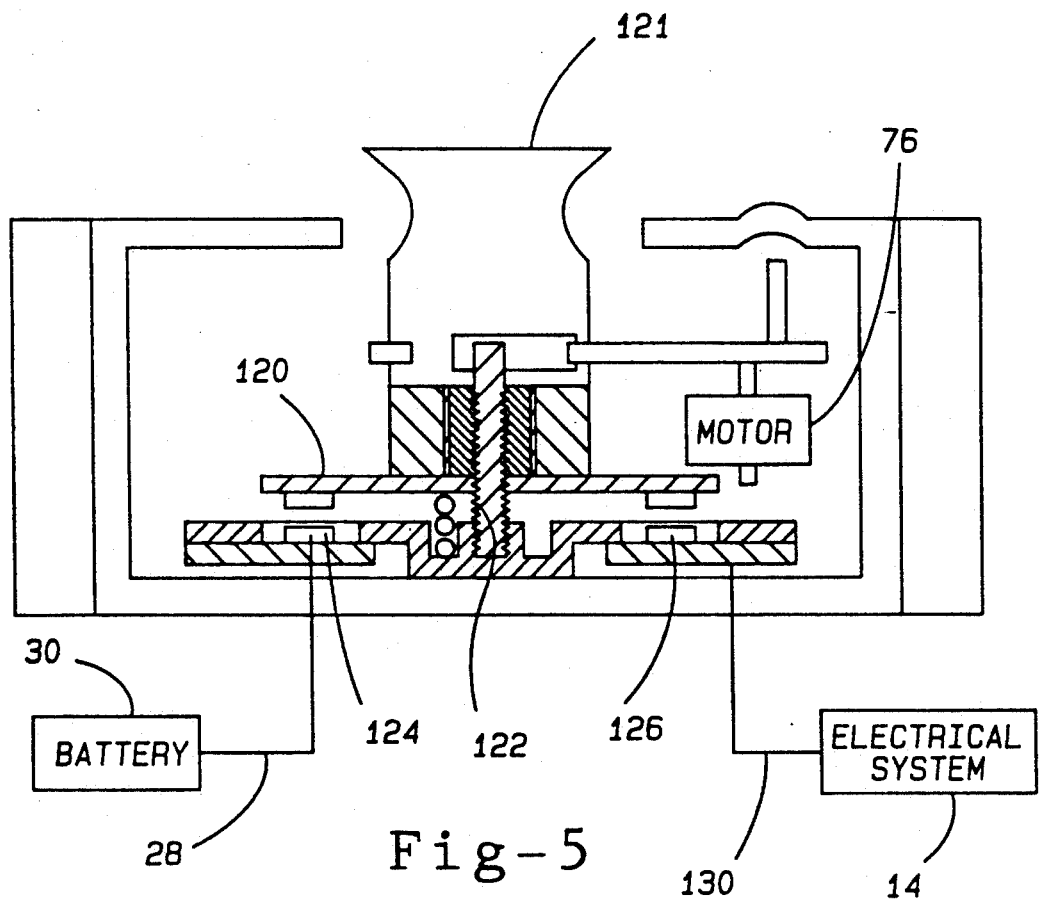
FIG. 5 is a sectional view illustrating a portion of the preferred embodiment of the present invention.

With reference now to FIG. 5, although any conventional switch 22 can be used to disconnect the battery 30 from the engine electrical system 14, in the preferred form of the invention, a plate 120 is threadably mounted on a threaded shaft 122. The plate 120 is movable between an open position in which the plate 120 is spaced from two electrical contacts 124 and 126, and a closed position in which the plate 120 contacts the electrical contacts 124 and 126. The contact 124 is connected by the line 28 to the battery 30 while the contact 126 is connected by line 130 to the vehicle electrical system 14.

In order to move the plate 120 between its open and closed position, the device includes the motor 76 which is mechanically connected to the threaded shaft 122. Thus, activation of the motor 76 by the microprocessor rotatably drives the shaft 122 in one direction thereby moving the plate 120 away from the contacts 124 and 126.

Preferably, the connection between the plate 120 and the threaded shaft 122 is a slip connection so that, with the plate 120 in its open position, the plate can be manually depressed and moved to its closed position by depressing a reset button 121 without rotation of the shaft 122 to reset the switch 22. A locked access door 140 (FIG. 1) on the housing 24 provides access to the switch 26 for this purpose. The access door 140 can include a conventional key lock, a keyboard entry pad connected to the microprocessor, a radio controlled lock or the like.

Since the battery terminal connection as well as the reset button 121 are contained within the locked interior of the housing 24, once the alarm system has been activated and the battery disconnected from the ignition system, it will not be possible for an unauthorized user to start the vehicle.

Many further improvements will become apparent to those skilled in the art. For example, a signal on a line 142 (FIG. 3) to the microprocessor 36 indicative of the authorized use of the vehicle by the ignition key or the like may be used to reset or close the switch 22 (if open) and enable ordinary use of the vehicle.

In an alternative embodiment of the invention, the battery disconnect device automatically disconnects the battery from the ignition system whenever the vehicle engine is turned off. Thereafter, the device is responsive to a signal on line 142 indicative of an authorized use of the vehicle to automatically reset or close the switch 22. In this case, actuation of the vehicle ignition system, for example by the insertion and rotation of the engine ignition key, would generate the signal on line 142 and electrically reconnect the battery to the engine ignition system.

In still a further modification of the invention, a manual disconnect switch 149 (FIG. 2) can be used so that actuation of the switch 149 actuates the switch 26 from its closed to its open position thereby disconnecting the battery 30 from the ignition system 14. Such a modification would be particularly advantageous in marine applications since it would protect marine vessels against theft when the owner leaves the vessel.

From the foregoing, it can be seen that the present invention provides a simple and yet inexpensive antitheft system for a vehicle which prevents the operation and theft of the vehicle by electrically disconnecting the battery from the vehicle electrical system.

Having described my invention, however, many modifications thereto will become apparent to those skilled in the art to which it pertains without deviation from the spirit of the invention as defined by the scope of the appended claims.

I claim:

1. For use in conjunction with a vehicle having an engine and a battery, an electrical system with an electrical starter, an antitheft device comprising:
   means for detecting an unauthorized attempt to use the vehicle and for generating an output signal representative thereof;
   an electrically conductive plate and a pair of electrical contacts connected in series, between said battery and said vehicle electrical system;
   means for mechanically connecting said plate to a threaded shaft,
   a motor for rotatably driving said shaft so as to move said plate from a closed position in which said plate mechanically contacts and electrically completes an electrical circuit between said contacts to an open position in which said plate is spaced from said contacts thereby electrically disconnecting said battery from said electrical system; and
   means responsive to said output signal for actuating said motor.

2. The invention as defined in claim 1 and comprising a housing having an interior in which said plate is contained, and means for preventing unauthorized access to said housing interior.

3. The invention as defined in claim 2 wherein said unauthorized access preventing means comprises an access door on said housing and a lock on said access door.

4. The invention as defined in claim 1 and comprising means for detecting an engine running condition and for disabling said motor actuating means in response to an engine running condition.

5. The invention as defined in claim 4 wherein said engine run detecting means comprises means for sensing electrical noise on the vehicle electrical system and means for comparing said electrical noise with a noise pattern indicative of engine running condition.

6. The invention as defined in claim 5 wherein said comparing means comprises a preprogrammed microprocessor.

* * * * *